Jan. 16, 1968 W. H. SUYDAM 3,364,287
METHOD OF LINING A ROTARY KILN
Filed Oct. 4, 1965

INVENTOR.
WILSON H. SUYDAM
ATTORNEY

United States Patent Office 3,364,287
Patented Jan. 16, 1968

3,364,287
METHOD OF LINING A ROTARY KILN
Wilson H. Suydam, Houston, Tex., assignor to Harbison-Walker Refractories Company, Pittsburgh, Pa., a corporation of Pennsylvania
Filed Oct. 4, 1965, Ser. No. 492,461
4 Claims. (Cl. 264—30)

ABSTRACT OF THE DISCLOSURE

Method of lining at least the firing zone of a rotary kiln with a checkerboard pattern of direct bonded and pyroplastic basic brick. The spacing is such that the pyroplastic shapes provided a plurality of dispersed anchor points capable of rapidly reacting with material being fired in the kiln to thereby form a coating over all brick.

---

Figure 2:
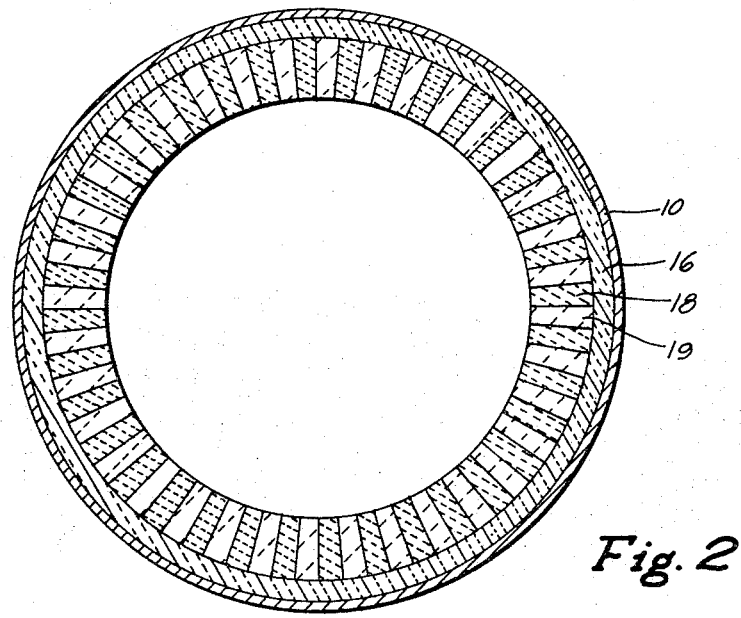

The popularity of rotary kilns is based upon their ability to treat many different materials uniformly and continuously over a wide range of output capacities. Numerically, the most important are the kilns used for producing cement clinker, lime, and calcined dolomite. Rotary kilns are also used in the processing or manufacture of phosphates, alumina, magnesia, titania, zirconia, carbon or coke, manganese dioxide, lightweight aggregates, and ores of iron, chromium, lithium, and uranium; for calcining clay and bauxite, reduction of some metals, the burning of sulfur, and the processing of lithopone.

Commercial kilns range in size from those only a few yards in length and 3 to 6 feet in diameter to giants over 500 feet long and with diameters of 12 feet or more. Rotary kilns generally are divided into three zones known as the preheat zone located at the feed end, the burning or firing zone centrally located, and the cooling zone at the discharge end. The linings in a single kiln may be exposed to a temperature range from about 500° F. at the cooler end to over 3200° F. in the high-temperature zone. Mechanical and physical changes in the kiln load usually attend the temperature rise, and the lining in different zones of the kiln may have to resist abrasion and impact of the load, destructive action of hot gases and fumes, and corrosive chemical attack by the hot charge. Increasingly rigorous kiln conditions, imposed by higher operating temperatures or greater chemical activity of materials in contact with the linings, necessitate the use of refractories especially suited for each kiln and kiln zone.

No single refractory can economically be used to resist all the conditions throughout a rotary kiln. To obtain optimum results, it is necessary to use specific refractories for each of the various combinations of service conditions. For resistance to abrasion at the moderate temperatures which prevail in the feed ends of many kilns, hard, dense, fireclay brick often give good service. Higher temperatures require additional refractoriness, and selection may be made from high-duty fireclay brick. Super-duty fireclay brick are used in the most severe service that fireclay refractories can withstad. The mechanical strength, corrosion resistance, or refractoriness of super-duty brick make is economical to use these in the lining of high-temperature zones of some kilns and in the intermediate zones of others, depending upon the maximum temperature of operation. They may often be used advantageously at intermediate temperatures, where maximum resistance to abrasion is required.

Chemical and thermal conditions too severe for fireclay refractories require lining of high alumina or basic refractories. Basic refractories are necessarily used for the most economical operation of some kilns. "Basic brick" is a term used in the refractories art to describe refractories made from the raw materials magnesite (dead burned magnesia) and refractory grade chrome ores. Dolomite has been suggested. Those brick of magnesia and chrome ore having a predominance of magnesite are referred to as magnesite-chrome refractories, and those with a predominance of chrome ore are referred to as chrome-magnesite refractories. Basic brick have high resistance to attack by chemically basic materials, and withstand much higher temperatures than other commercially available refractories; for example, fireclay and high alumina brick. In addition, some basic brick gain resistance to chemical attack and thermal conditions by their ability to take on and hold a protective coating in various kiln operations. The main failing of basic brick generally is their sensitivity to temperature change. Rapid change (thermal shock) often results in cubing, cracking, and spalling away of the refractory brick. This spalling is also promoted by mechanical strains developed in the brick due to "pinching" caused by the thermal expansion of the brick lining. The aforementioned protective coating aids in diminishing the sensitivity of basic brick temperature change.

A most successful type of basic brick that has been used in many rotary kiln linings has what is known as a pyroplastic character at temperatures in excess of 2800° F. By pyroplastic, it is meant that the hot face soften and yields but does not fail. This brick does not crack and spall away at operating temperatures partially because of its ability to yield and thereby compensate for thermal stresses, and also partially because it takes on a coating very rapidly. An example of a burned basic pyroplastic refractory composition is fabricated of a refractory batch which after firing exhibits the mineralogical phases periclase, dicalcium silicate, and spinel ($MgO \cdot Fe_2O_3$, $MgO \cdot Al_2O_3$, $MgO \cdot Cr_2O_3$, etc. in a solid solution or as spaced inclusions). In a weight relationship, these mineral phases are present in the range of about 50% periclase, about 20–35% dicalcium silicate, and the remainder spinel. The techniques for manufacturing such a refractory is taught in U.S. Patents 2,291,917 and 2,291,918, to Pitt et al.

Operating temperatures have now increased to the point where basic brick of the pyroplastic type are often unsuitable. It has been necessary to turn to the more exotic types of basic brick. These include what are known in the art as "direct-bonded" brick and fused grain brick. Conventional burned basic brick are referred to as silicate-bonded because they are characterized by silicate (forsterite, monticellite, or others) film about or between chrome ore and magnesite grains, which film in a sense "glues" them together. In the direct-bonded type of burned basic brick, the silicate film has been minimized or substantially eliminated, so there is a large degree of direct attachment between adjacent chrome ore and magnesite grains. The elimination of the silicate film is significant because it has a much lower softening temperature than the magnesite and chrome ore grains and substantially reduces the high-temperature strength of conventional brick. Techniques for manufacturing direct-bonded brick are taught in U.S. Patents 3,180,743 and 3,180,744 to Ben Davies and Frank H. Walther.

Fused grain basic refractories are manufactured, for example, by completely fusing chrome ore and magnesia batch constituents in an electric furnace, cooling the raw material, crushing and sizing it to form a refractory brick-making batch, tempering the batch with a room temperature binder, pressing into brick, and firing. Some of these brick have outstanding properties and can be compared to direct-bonded brick because there is little silicate film between grains.

While these exotic, burned, basic refractories can withstand the higher operating temperatures now used in rotary kilns, they have several drawbacks. They make it difficult to obtain and hold a coating. They have higher thermal conductivities which increases shell temperatures, and they have the tendency to fail by spalling away due to lower thermal shock resistance partially due to increased "pinching."

It is, therefore, an object of this invention to provide a refractory lining for the hot zone of rotary kilns operating at very high temperatures which will be more refractory and yet will take and hold a coating, will not be excessively heat conducting, and will not fail by spalling away. Other objects and advantages of this invention will become apparent by a study of the following figures and descriptions.

Briefly, according to one aspect of this invention, a refractory brick lining is provided in the hot zone of a rotary kiln having a checkerboard construction consisting of alternating types of burned basic brick. The first type is selected from the group comprised of direct-bonded chrome-magnesite and magnesite-chrome brick and fused grain chrome-magnesite and magnesite-chrome brick. Also usable are brick of mixtures of high purity ingredients of the type used in making direct-bonded brick and fused grain. All of these brick can be defined by the terms "high purity brick of mixtures of magnesite and chrome ore characterized by extensive direct-bonding between chrome spinel and periclase (dead burned magnesite) ingredients with substantially no intervening silicates." The second type is a brick which becomes pyroplastic at operating temperatures.

Figure 1:
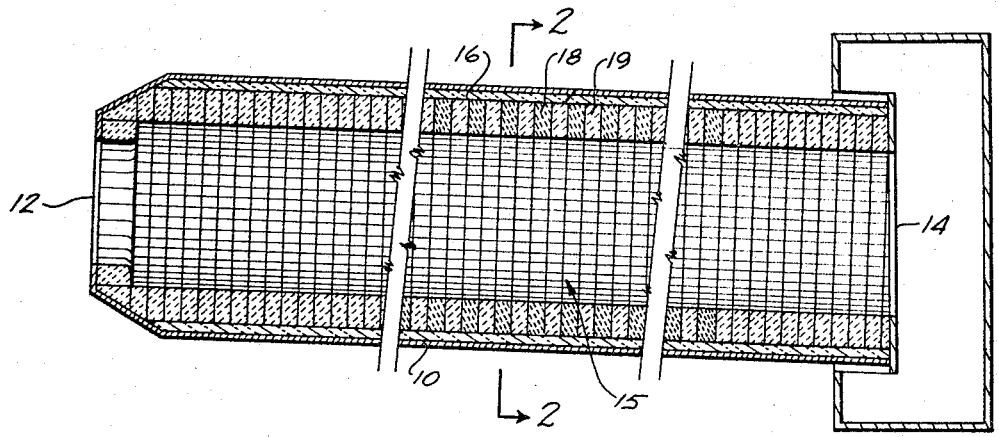

This invention will be described further in conjunction with the attached drawings. FIG. 1 is a cross-section through a typical rotary kiln according to this invention parallel to the direction of flow. FIG. 2 is a cross-section perpendicular to the direction of flow.

The outer shell of the rotary kiln 10 is tubular in shape and has a feed end 12 and a discharge end 14. The central portion 15 of the rotary kiln is normally hotter than the rest of the kiln and known as the "hot zone." Directly against the shell is a backup lining 16 which is usually fire clay or insulating material. Some constructions do not require a backup. The working lining is adjacent to the backup lining. According to this invention, the working lining in the hot zone is a checkerboard construction comprising alternating refractory brick types. The first type, 19, is selected from the group comprised of direct-bonded chrome-magnesite and magnesite-chrome brick and fused grain chrome-magnesite and magnesite-chrome brick. The second type, 18, is a burned basic brick which becomes pyroplastic at operating temperatures.

In some manner not completely understood there is a novel and perhaps synergistic cooperation between the direct-bonded type of brick and the pyroplastic ones which are used in the lining construction of this invention. As has been expressed above, the direct-bonded brick would appear eminently suited for the high-temperature conditions except for lack of thermal spall resistance and the apparent inability to pick up and hold a coating in service. Further, any coating which is picked up accumulates at a very slow rate. However, when brick of the direct-bonded type are interspersed in checkerboard fashion with pyroplastic ones of the type above discussed, the desired coating rapidly builds up. It would seem the pyroplastic brick, even though not sufficiently refractory, act as anchor points between the considerably more refractory direct-bonded type of brick to rapidly accumulate a monolithic coating over the hot zone. These anchor points of pyroplastic brick tenaciously hold even adjacent portions of the coating over the usually nonadhesive surfaces of direct-bonded brick. At the same time, the more refractory direct-bonded brick protect the pyroplastic brick from rapid destruction. Still further, the side surfaces of the direct-bonded and pyroplastic brick adhere to each other adjacent the hot face through chemical reaction of ingredients, thereby providing a more monolithic backup wall for the coating.

While in the drawings I have shown alternating checkerboard pattern of single brick it should, of course, be understood that pluralities of groups of the various types of brick can be alternated. For example, there could be 2 or 3 brick forming each square of direct-bonded type brick interspersed thereabout being 2 or 3 or 4 of the pyroplastic type of brick thereby forming an adjacent square of pyroplastic refractory. Of course, it is critical that the size of these squares of direct-bonded refractory and pyroplastic refractory be no larger than that at which the desired cooperation between them discussed above, can occur. The pyroplastic brick are in the lining only to anchor the coating and provide some "give" during initial heatup of the lining. Once the lining is in service it is the direct bonded brick which provide the desired refractoriness.

Having thus described the invention in detail and with sufficient particularity as to enable those skilled in the art to practice it, what is desired to have protected by Letters Patent is set forth in the following claims.

I claim:

1. That method of promoting the formation of coating over direct bonded brick in the firing zone of a rotary kiln comprising the steps of (1) laying in a discontinuous pattern a mixture of two types of basic refractory brick, the first type of basic refractory being pyroplastic and capable of chemically reacting over abutting surfaces with adjacent second type brick at elevated temperatures, the second type brick being of direct bonded type and made of material selected from the group consisting essentially of high-purity magnesite, chrome ore, and mixtures thereof, (2) spacing said pyroplastic shapes to provide a plurality of dispersed anchor points capable of rapidly reacting with the material being fired in the kiln to thereby form a coating, (3) operating said kiln to cause said pyroplastic refractory to pick up a coating and anchor it over both itself and the direct bonded brick.

2. The method of claim 1 in which said direct bonded brick is of a high-purity mixture of magnesite and chrome ore in which the magnesite predominates.

3. The method of claim 1 in which the direct bonded brick are made of fused grain.

4. The method of claim 1 in which said discontinuous pattern is a checkerboard arrangement of substantially square groups of direct bonded and pyroplastic brick.

References Cited

UNITED STATES PATENTS

| | | | |
|---|---|---|---|
| 2,606,017 | 8/1952 | Longenecker | 266—43 |
| 2,635,865 | 4/1953 | Brumbaugh | 266—43 X |
| 3,134,199 | 5/1964 | Scheffer | 266—43 X |
| 3,217,458 | 11/1965 | Freeman | 266—43 X |

J. SPENCER OVERHOLSER, *Primary Examiner.*

E. MAR, *Assistant Examiner.*